H. N. OTT.
PROJECTION APPARATUS.
APPLICATION FILED JULY 31, 1912.

1,176,485.

Patented Mar. 21, 1916.
3 SHEETS—SHEET 1.

Witnesses.

Inventor.
Harry N. Ott,
By Wilhelm, Parker & Hurd,
Attorneys.

H. N. OTT.
PROJECTION APPARATUS.
APPLICATION FILED JULY 31, 1912.

1,176,485.

Patented Mar. 21, 1916.
3 SHEETS—SHEET 3.

Witnesses.

Inventor.

UNITED STATES PATENT OFFICE.

HARVEY N. OTT, OF BUFFALO, NEW YORK, ASSIGNOR TO SPENCER LENS CO., OF BUFFALO, NEW YORK.

PROJECTION APPARATUS.

1,176,485.　　　Specification of Letters Patent.　　Patented Mar. 21, 1916.

Application filed July 31, 1912.　Serial No. 712,413.

*To all whom it may concern:*

Be it known that I, HARVEY N. OTT, a citizen of the United States, residing at Buffalo, in the county of Erie and State of New York, have invented a new and useful Improvement in Projection Apparatus, of which the following is a specification.

This invention relates to projection apparatus of the kind adapted for projecting images from both lantern slides, or transparent illustrations, and opaque illustrations or objects.

One object of the invention is to produce a practical and convenient projection apparatus of this sort in which the change from one to another kind of projection can be effected easily and practically instantaneously and which will insure a very perfect and brilliant illumination of opaque illustrations and objects.

Another object is to provide an efficient and practical projection apparatus capable of being quickly and easily manipulated to project images from either transparent or opaque illustrations and objects, or microscopic specimens.

With these objects in view the apparatus comprises three projection objectives or systems of lenses, each for projecting images from one of the different kinds of illustrations or objects, and an illuminating and a reflecting device which are adapted to be shifted in position so as to coöperate with one or another of the objectives for producing one or another kind of projection. The reflecting device or mirror is also arranged so that the opaque illustrations or objects are illuminated by reflected rays from the mirror in addition to the direct rays from the illuminating device, thus producing a more brilliant and uniform illumination of the illustration or object.

Figure 1:
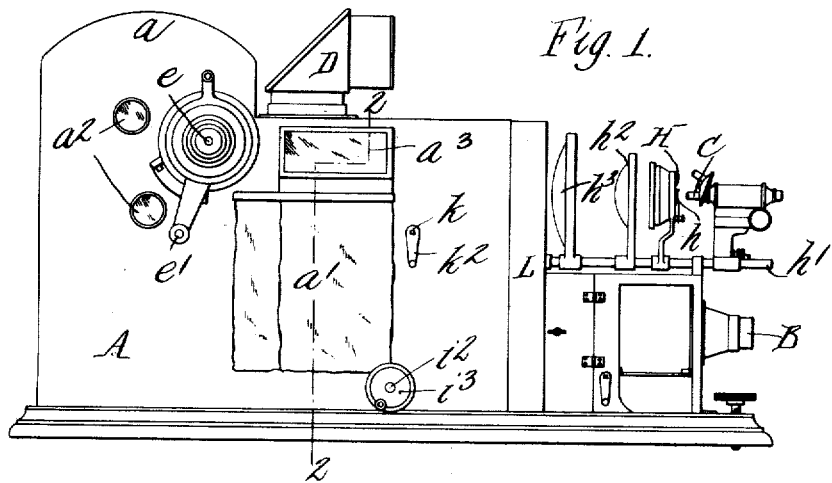
Figure 2:
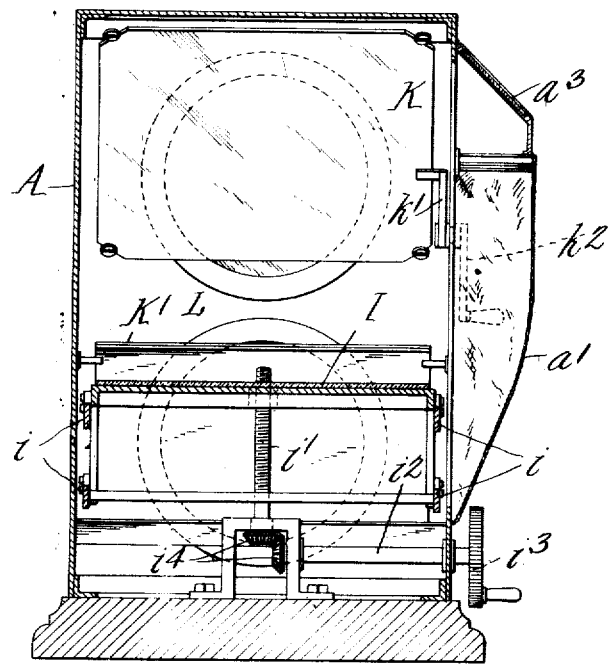
Figure 3:
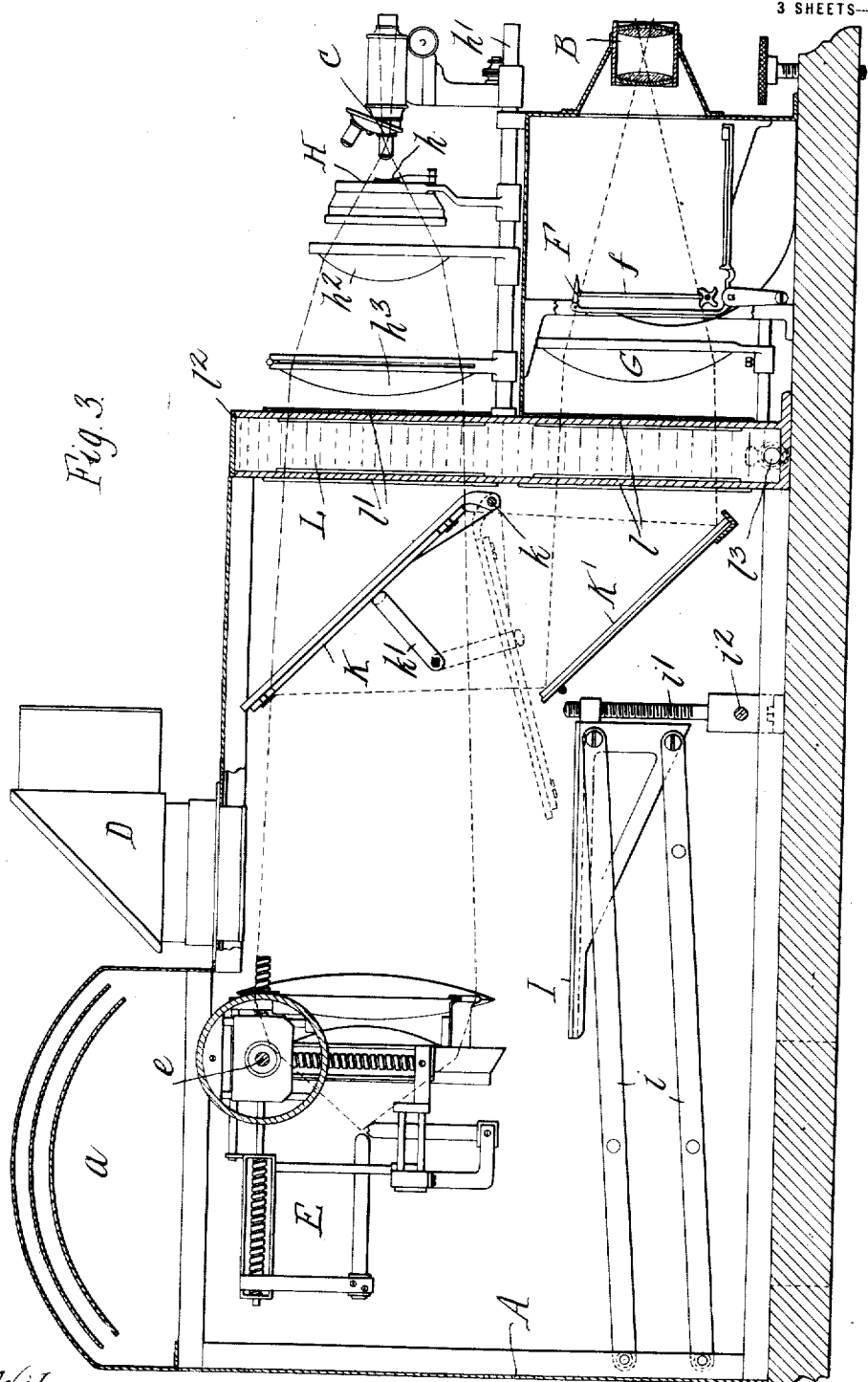
Figure 4:
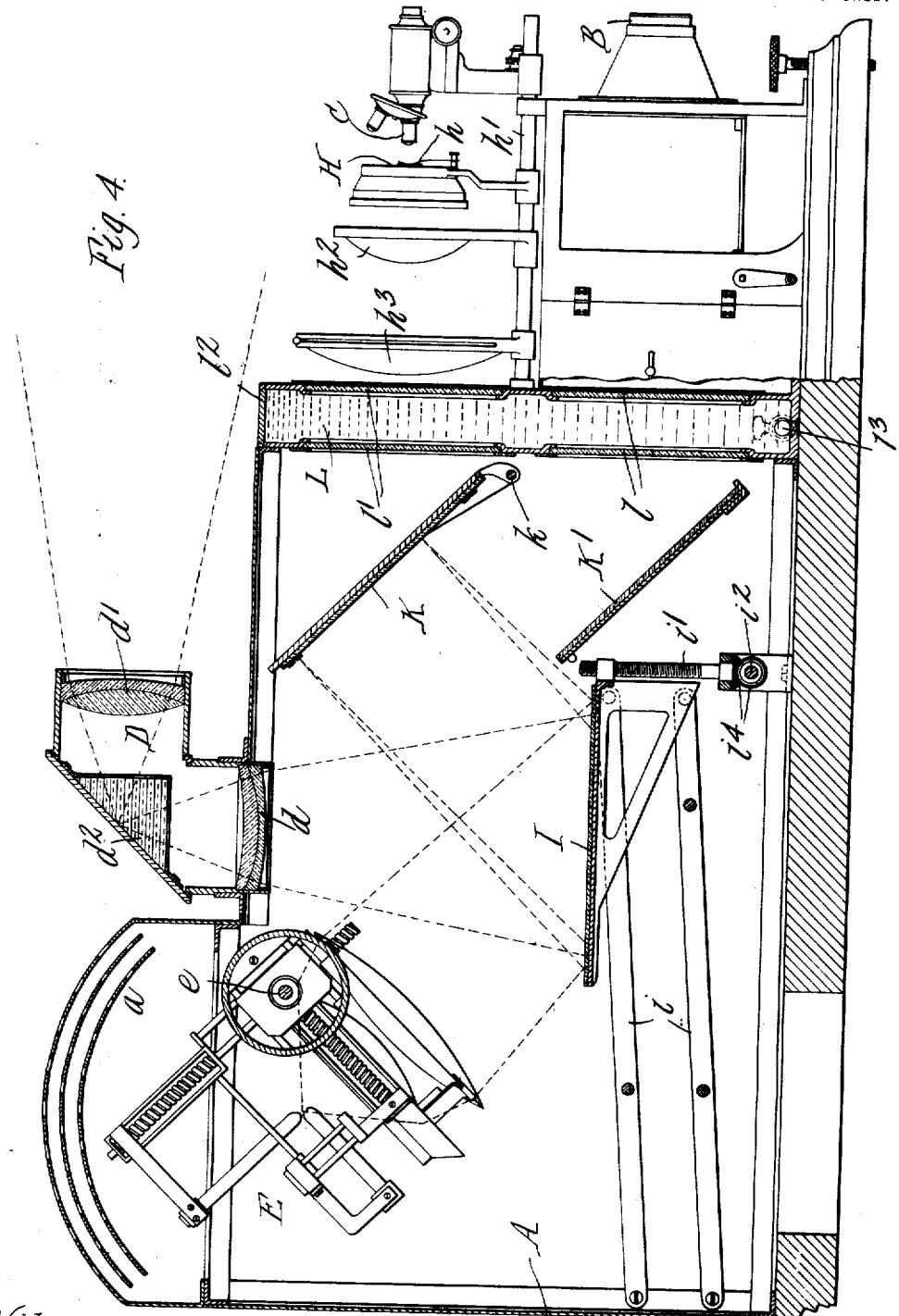

In the accompanying drawings, consisting of three sheets: Figure 1 is a side elevation of a projection apparatus embodying the invention. Fig. 2 is a transverse sectional elevation thereof, on an enlarged scale, in line 2—2, Fig. 1. Fig. 3 is a longitudinal sectional elevation of the apparatus showing by full and broken lines the positions of the parts when used as a stereopticon and for producing images of microscopic specimens. Fig. 4 is a longitudinal sectional elevation, on a different plane, showing the position of the parts for projecting images of opaque objects.

Like reference characters refer to like parts in the several figures.

A represents the casing or light chamber of the projection apparatus, and B C and D represent the projection objectives for the transparencies, the microscopic specimens and the opaque illustrations or objects, respectively.

The casing or light chamber A may be of any suitable form and construction, that shown in the drawings being substantially rectangular with a ventilating cap or hood $a$ for the heat arising from the illuminating device or lamp. The casing is provided at one side with an opening covered by curtains $a'$ through which access is afforded to the casing for inserting and manipulating the opaque illustrations and objects or for other purposes, and this side of the casing is also provided with suitable windows $a^2$ through which the lamp can be observed, and with a smoked glass window $a^3$ through which the operator can look to properly position and manipulate the opaque illustrations and objects.

The projection objective B for the transparencies and that C for the microscopic specimens are arranged one below the other in front of the casing and may be of any ordinary construction adapted for the intended purpose. The other objective, D, for the opaque illustrations or objects, is arranged on top of the casing or chamber A and preferably comprises proximal and distal lenses $d$ and $d'$ and a prism $d^2$ arranged between the lenses for changing the direction of the light rays. A projection objective constructed in this way, with the prism between the lens system, is far superior to constructions heretofore employed having a mirror, since a glass mirror throws a double reflection, making a hazy image, and a metallic reflecting surface soon becomes tarnished.

E represents an illuminating device or lamp arranged in the upper rear portion of the casing A, and preferably consisting of an electric arc lamp, which is movably mounted so as to be moved to place it in the position shown in Fig. 3 for illuminating the transparencies and microscopic specimens, or in the position shown in Fig. 4 for illuminating the opaque illustrations or objects. The lamp shown is pivotally mounted so that it can be swung from one position to the other about an axis, indicated at $e$, by a suitable handle or operating device $e'$, Fig. 1, located outside of the casing A. In so far as the present invention is concerned, the lamp can be constructed and pivotally mounted to swing as described in any suitable manner, but it is preferably constructed and mounted as fully explained in an application field by myself and C. W. Barton of even date herewith, Serial No. 712,412.

F represents a holder for the lantern slide or transparency, indicated at $f$. This holder is arranged in front of the casing A between the objective B and the lamp and is preferably constructed as fully described in my application Serial No. 680,895, filed March 1, 1912. A slide holder of any other suitable construction could, however, be employed. G represents a condensing lens, of ordinary construction, adjustably mounted in rear of the slide holder F.

H represents a holder or support for the microscopic specimen, indicated at $h$. As shown, this holder, which may be of the usual or any suitable construction, is adjustably mounted in rear of the microscopic objective C on horizontal rods $h'$ which support the objective C.

$h^2$ and $h^3$ indicate condensing lenses of ordinary construction adjustably mounted on the rods $h'$ between the specimen holder H and the light casing A.

I represents a holder for the opaque illustrations or objects. This holder is arranged in the light casing A to support the illustration or object in operative relation to the objective D and below the path of the light rays from the lamp E when the apparatus is used for lantern slide and microscopic work. The holder shown consists of a horizontal shelf or table, preferably having a reflecting surface, on which the illustration or object is laid and which is movably supported by parallel links $i$ suitably pivoted in the casing, and an adjusting screw $i'$ which is journaled in the casing and engages a threaded nut attached to the shelf I. The adjusting screw $i'$ is turned, for adjusting the holder vertically, by a horizontal shaft $i^2$ provided outside of the casing with an operating handle $i^3$ and connected by beveled gears $i^4$. Fig. 4, to the adjusting screw. This mechanism enables the vertical adjustment of the support I necessary to properly focus the illustration or object supported thereby. The holder could be mounted and adjusted in any other suitable way.

K and K' represent reflecting devices or mirrors arranged one above the other in the front portion of the light chamber or casing A. The upper mirror K is movably mounted in any suitable way in the casing so that it can be readily shifted from the position shown by full lines in Figs. 3 and 4 to that indicated by dotted lines in Fig. 3. As shown, the mirror is pivoted at its front end by a horizontal shaft or rod $k$ and is supported by an arm $k'$ on a shaft which extends through one side wall of the casing and is provided outside of the casing with an actuating handle $k^2$. By turning this handle in one direction the mirror is lowered from the inclined position shown in Figs. 3 and 4 to and supported in the position shown by dotted lines in Fig. 3, and by turning the handle in the opposite direction the mirror is returned to and supported in the inclined position. When the mirror is in the inclined position shown in Fig. 3, and the lamp is in the position shown in Fig. 3 so as to throw the light rays on the mirror K, the rays will be reflected by the mirror K to the mirror K' and by the latter so as to illuminate lantern slides in the holder F, thus enabling the projection of images from lantern slides or transparencies. In this position of the mirror K it cuts off the light from the microscopic projecting lens. When it is desired to project microscopic images it is only necessary to turn the handle $k^2$ to lower the mirror to the dotted line position shown in Fig. 3, thereby allowing the light rays to pass horizontally from the lamp and illuminate the microscopic specimens placed on the holder H.

If it is desired to project images from opaque illustrations or objects when the apparatus has been previously in use for microscopic work, the handles $e'$ and $k^2$ are turned to swing the lamp E and the mirror K to the position shown in Fig. 4, but if the apparatus has been in use for lantern slide work, the mirror K will be in the position shown in Fig. 4 and it will then only be necessary to operate the handle $e'$ to swing the lamp to the inclined position. In this position of the parts the opaque illustration or object on the holder I will be illuminated by the direct rays from the lamp so that the objective D will project the reflected image of the illustration or object on the screen. The direct rays from the lamp are supplemented by reflected rays from the mirror K as indicated by the dotted lines in Fig. 4, and as a consequence the illustration or object is much more brilliantly illuminated, and a brighter, clearer image is obtained than would be possible with only the direct illumination by the lamp. Furthermore, the direct and reflected rays are thrown on the object from opposite sides thereof so that if the object has raised or depressed portions the sides thereof, as well as the top surface, will be illuminated, thus avoiding deep shadows.

At the front of the casing A is preferably provided a water cooling cell L. This cell preferably consists of an upright metal case provided opposite the objective B with suitable lenses or glasses $l$, and opposite the microscopic attachment C with glasses or lenses $l'$. The cell case is provided at its top with a covered filling opening $l^2$ for the cooling liquid and at its bottom with a valved drain nozzle $l^3$. The case of the cooling cell forms a double front wall for the light chamber or casing A. Separate cooling cells appropriately arranged with reference to the projection objectives B and C could be employed in place of the double cell above described, but the latter materially simplifies the construction and is therefore preferred.

I claim as my invention:

1. In a projection apparatus, the combination of a light chamber, a holder for an opaque object, a source of light and a coöperating reflecting device arranged to illuminate the opaque object by both direct and reflected light rays, and a projection objective arranged in operative relation to said opaque object, source of light and reflecting device, and in a plane between said source of light and said coöperating reflecting device, substantially as set forth.

2. In a projection apparatus, the combination of a light chamber, a holder for an opaque object, a source of light and a coöperating reflecting device arranged to illuminate the opaque object by direct and reflected light rays from different directions, and a projection objective arranged opposite said holder in operative relation to the opaque object thereon, and in a plane between said source of light and said coöperating reflecting device, substantially as set forth.

3. In a projection apparatus, the combination of a light chamber, a holder for an opaque object, a source of light and a coöperating reflecting device arranged at opposite sides of said holder to illuminate the opaque object by direct light rays from one direction and by reflected light rays from the opposite direction, and a projection objective arranged opposite said holder in operative relation to the opaque object thereon, substantially as set forth.

4. In a projection apparatus, the combination of a light chamber, a holder for an opaque object, a source of light and a projection objective arranged at opposite sides of said holder, said course of light being movable to operative position either with relation to said opaque object or with relation to said projection objective, a movable reflecting device which is adapted to illuminate said opaque object by reflected rays in one position of said source of light and allows the passage of light rays to said projection objective in the other position of said source of light, and a projection objective in operative relation to the opaque object on said holder, substantially as set forth.

5. In a projection apparatus, the combination with a light chamber, a holder for an opaque object, a source of light and a projection objective arranged at opposite sides of said holder, said source of light being movable to different positions for directing the light rays either to said opaque object or to said projection objective, a movable mirror which is adapted to be positioned between said source of light and said projection objective for illuminating said opaque object by reflected rays or to allow the passage of light rays to said projection objective, and a projection objective in operative relation to the opaque object on said holder, substantially as set forth.

6. In a projection apparatus, the combination of a light chamber, a holder for an opaque object, a source of light and a projection objective arranged at opposite sides of said holder, said course of light being movable to different positions for directing the light rays either to said opaque object or to said projection objective, a second projection objective, mirrors for reflecting the light rays to said second objective, one of said mirrors being arranged between the source of light and said first mentioned objective and being movable to allow the passage of light to said first mentioned objective, and a third projection objective in operative relation to the opaque object on said holder, substantially as set forth.

7. In a projection apparatus, the combination of a light chamber, a holder for an opaque object, a source of light and a projection objective arranged at opposite sides of said holder, said source of light being movable to operative position either with relation to said opaque object or with relation to said projection objective, a movable reflecting device which is adapted to illuminate said opaque object by reflected rays in one position of said source of light and allows the passage of light rays to said projection objective in the other position of said source of light, means exterior to said chamber for moving said source of light from one to the other of its operative positions, and a projection objective in operative relation to the opaque object on said holder, substantially as set forth.

8. In a projection apparatus, the combination of a light chamber, a holder for an opaque object, a source of light and a projection objective arranged at opposite sides of said holder, said source of light being movable to different positions for directing the light rays either to said opaque object or to said projection objective, a movable mirror which is adapted to be positioned between said source of light and said projection objective for illuminating said opaque object by reflected rays or to allow the passage of light rays to said projection objective, devices exterior to said chamber for moving said source of light and said mirror from one to the other of their operative positions, and a projection objective in operative relation to the opaque object on said holder, substantially as set forth.

Witness my hand, this 26th day of July, 1912.

HARVEY N. OTT.

Witnesses:
 CORA FACKLAM,
 LOUIS M. POTTER.

Copies of this patent may be obtained for five cents each, by addressing the "Commissioner of Patents, Washington, D. C."

It is hereby certified that in Letters Patent No. 1,176,485, granted March 21, 1916, upon the application of Harvey N. Ott, of Buffalo, New York, for an improvement in "Projection Apparatus," errors appear in the printed specification requiring correction as follows: Page 1, line 95, for the word "system" read *systems;* page 2, line 16, for the word "field" read *filed;* page 3, lines 61 and 93, claims 4 and 6, for the word "course" read *source;* and that the said Letters Patent should be read with these corrections therein that the same may conform to the record of the case in the Patent Office.

Signed and sealed this 2d day of May, A. D., 1916.

[SEAL.]

R. F. WHITEHEAD,
*Acting Commissioner of Patents.*

Cl. 88—26.